United States Patent Office 2,964,457

Patented Dec. 13, 1960

2,964,457

SILICA REINFORCED RUBBER

Gerard Kraus, Bartlesville, Okla., assignor to Phillips Petroleum Company, a corporation of Delaware No Drawing. Filed June 28, 1957, Ser. No. 668,602

12 Claims. (Cl. 204—154)

This invention relates to an improved silica reinforced rubber which is cured in the absence of sulfur curing systems and to a method of preparing such a rubber stock.

Silica reinforced natural or synthetic rubbers are highly desirable in decorative applications since these stocks can be readily whitened or colored with chromatic pigments. Difficulties are ordinarily encountered in sulfur curing silica reinforced stocks, however, as the silica appears to inhibit the cure. In order to obtain a satisfactory vulcanizate, sulfur and vulcanization accelerator are normally required in larger amounts than are ordinarily used for rubber stocks reinforced with carbon black.

I have found that quite unexpectedly silica reinforced rubber stocks can be cured with improved properties, such as modulus and tensile strength, by subjecting the silica reinforced stock to high energy radiation, such as alpha rays, beta rays, gamma rays, or X rays. These rubber stocks thus cured in the absence of sulfur were surprisingly superior in tensile strength over similar stocks cured to the same level with sulfur. Vulcanization of natural and synthetic rubbers reinforced with silica according to my invention can be carried out in the absence of sulfur and various curatives, such as vulcanization accelerators, accelerator activators, and the like and thereby greatly reduce or eliminate the problem of post vulcanization. Since the vulcanization is effected in absence of sulfur, the aging properties of the rubber stock is greatly improved. In addition advantages of vulcanization by radiation can be enjoyed since no heating is required and relatively thick sections of rubber can be vulcanized uniformly by exposing the rubber to ionizing radiation.

It is an object of this invention to provide an improved silica reinforced rubber which is cured in the absence of sulfur curing systems.

It is another object of this invention to provide an improved colorable cured rubber stock with improved tensile strength.

It is still another object of this invention to provide a method of preparing improved cured rubber stocks which are reinforced with silica.

Other objects, advantages and features of this invention will be apparent to those skilled in the art from the following description and appendant claims.

Natural rubber, most synthetic elastomers, certain plastics can be cross-linked by exposure to high energy ionizing radiation. It has been accepted, however, that rubber stocks vulcanized in this manner are inferior in tensile strength to the same stocks vulcanized to same level with sulfur curing systems. This is particularly true in the case of carbon black-reinforced natural and synthetic rubber. Quite unexpectedly I have found that in silica reinforced rubber stocks quite the opposite is true. As shown by the data presented in the examples of this specification, silica reinforced natural and synthetic rubbers vulcanized by exposure to ionizing radiation in the absence of sulfur curatives exhibit higher tensile strength than the same stock cured to the same level with a sulfur curing system. This striking reversal in the behavior of reinforced rubber now provides according to my invention enhanced possibilities for the production of whitened or colored rubber stocks for decorative applications where high tensile strength is required.

The elastomers which are applicable in my invention are those which will cross link rather than degrade when exposed to high energy radiation. Examples of such elastomers include natural rubber and synthetic rubbers such as polybutadiene, polyisoprene, polychloroprene and the like and such copolymers as butadiene/styrene, butadiene/2-methyl-5-vinylpyridine, butadiene/acrylonitrile, and the like. In general the synthetic elastomers which are applicable are those prepared by polymerization of conjugated dienes having from four to eight carbon atoms per molecule, or by copolymerization of mixtures of such conjugated dienes, or by copolymerization of a major amount of a conjugated diene with a minor amount of copolymerizable monomer containing a $CH_2{=}C{<}$ group. Examples of other copolymerizable monomers which can be used with the conjugated dienes are alpha-methylstyrene, halogen-substituted styrenes, alkyl-substituted styrenes, alkoxy-substituted styrenes, 2-vinylpyridine, 5-methyl-2-vinylpyridine, 5-ethyl-2-vinylpyridine, 4-methyl-2-vinylpyridine, 2-isopropenylpyridine, 5-propyl-2-isopropenylpyridine, 2-octyl-5-vinylpyridine, methacrylonitrile, methyl acrylate, methyl methacrylate, ethyl acrylate, ethyl methacrylate, ethyl vinyl ketone, methyl isopropenyl ketone, methyl vinyl ether, and the like.

The methods of preparing these synthetic elastomers are well known in the art. A common and suitable method is by emulsion polymerization in which the crude rubber is coagulated from the latex and separated as a rubber crumb. The rubber is then masticated and baled as the raw gum rubber which is used for compounding with the silica according to my invention. Natural rubbers which are available in such forms as smoked sheet or pale crepe are also suitable as gum rubber in the compounding step of my invention.

The silica employed as a reinforcing agent can be any colloidal silica normally used as a rubber filler. The amount of silica generally is in the range between about 20 and 150 parts by weight per 100 parts of gum rubber and may be higher in some instances, such as when a very hard stock is desired. The silica can be incorporated into the rubber by mill mixing, by using a Banbury mixer, or by a latex masterbatching operation wherein an aqueous slurry of the silica is prepared first and then mixed with the latex. If desired the silica can be blended with the rubber in a combination of methods, such as by incorporating part of the silica in a latex masterbatch and the remainder by mill mixing with the coagulum recovered from the latex.

Following preparation of the silica rubber blend as above described the rubber is molded or pressed in the form desired and vulcanized by irradiation in any of the commonly acceptable manners. The irradiation is preferably conducted by placing the blend adjacent a spent fuel element or a group of fuel elements after their withdrawal from a nuclear reactor. The irradiation can be conveniently carried out while the elements are "cooling off" in a canal adjacent the reactor, which canal is filled with deionized water. The fuel elements can be any suitable type which are capable of producing radiation intensities within the range hereinafter specified. In the specific examples which follow, the fuel elements consisted of a series of uranium plates enriched in uranium-235, each sheet being covered with a relatively thin sheet of aluminum. This work is done at the Materials Testing Reactor at Arco, Idaho, which is described in an article by John R. Huffman, appearing in Nucleonics 12, No. 4, 21–26 (April 1954).

The material to be irradiated is placed sufficiently close to the fuel elements to obtain a "nominal" dosage of about $10^6$ to $5\times10^8$ rep. (roentgens equivalent physical) preferably about $10^7$ to $10^8$ rep. Radiation dosages and rates as used in this discussion, examples and claims are the actual dosages received by an unmodified specimen in the radiation field. The unit of roentgen equivalent physical corresponds to an absorption of 93 ergs per gram of material, the material being water, hydrocarbon or rubber which have very nearly the same absorption coefficients. The radiation rate can vary from about $10^3$ to $3\times10^7$ rep. per hour. Lower rates can be used but are not practical from a time standpoint. Higher rates, e.g., up to $10^9$ rep. per hour are quite difficult to attain and, although usable, are not necessary for the practice of my invention.

The radiation produced by the above described spent fuel elements is gamma radiation, but X rays can also be employed provided the described radiation intensity and dosage are utilized. Any radiation which will produce ionization can be used to practice my invention. For example, either alpha or beta radiation is suitable. Because of the low penetrating power of this type of radiation, the source is preferably of an internal nature. Although fast neutrons can be employed to effect vulcanization, neutron radiation is less desirable because care must be exercised to filter out slow neutrons so that a minimum of residual activity is produced in the materials being irradiated. The time of radiation can vary so long as the prescribed dosage and radiation intensity are maintained. The temperature at which the radiation is conducted will generally vary in the range between 50 and 100° F., although higher or lower temperatures can be used if desired. The radiation dosage required for attaining a desired degree of vulcanization will depend somewhat upon the rubber to be vulcanized and upon the amount of silica employed as reinforcing agent. The optimum dosage and silica loading can be readily determined for the application desired.

In further description of my invention the following examples are presented which are exemplary only and should not be interpreted as limiting my invention unduly.

EXAMPLE I

Silica was blended on the mill with a butadiene/styrene rubber prepared by emulsion polymerization at 41° F. This rubber had a bound styrene content of 20 weight percent and a Mooney value (ML-4) of 52. Two blends were made using silica in amounts of 60 and 80 parts by weight per 100 parts of rubber. The samples were sheeted off the mill and pressed in a hydraulic press between sheets of Holland cloth to give sheets having a thickness of approximately 60 mils. Test specimens were cut from the resulting sheets and packed into aluminum cans which were closed, purged with nitrogen, and irradiated in a field of gamma rays at the Materials Testing Reactor at Arco, Idaho, at a canal temperature of approximately 75° F. Nitrogen at a pressure of 25 pounds per square inch was maintained in the cans during irradiation. The samples received a total dosage of $3\times10^7$ rep. (dose rate was $3.50\times10^6$ rep. per hour). They were removed from the gamma ray field and the products were evaluated.

Sulfur-cured controls were run for comparative purposes. The butadiene/styrene rubber was compounded in accordance with the following formulation:

| | Parts by weight |
|---|---|
| Butadiene/styrene rubber | 100 |
| Silica | 60,80 |
| Zinc oxide | 3 |
| Stearic acid | 2 |
| Flexamine [1] | 1 |
| Sulfur | 3 |
| Santocure [2] | 2 |

[1] Physical mixture containing 65 percent of a complex diarylamineketone reaction product and 35 percent of N,N'-diphenyl-p-phenylenediamine.
[2] N-cyclohexyl-2-benzothiazylsulfenamide.

The stocks were milled and cured 20 minutes at 307° F. and physical properties were determined. Larger amounts of sulfur and Santocure than are ordinarily employed in a carbon black recipe were used in the silica recipe in order to obtain an adequately cured stock. The following results were obtained on irradiated and sulfur-cured samples:

*Table I*

| | 300 Percent Modulus, p.s.i. | Tensile, p.s.i. | Elongation, Percent |
|---|---|---|---|
| Irradiated Samples: | | | |
| 60 Parts silica | 1,080 | 3,400 | 780 |
| 80 Parts silica | 1,900 | 3,030 | 450 |
| Sufur-Cured Sampled: | | | |
| 60 Parts silica | 940 | 2,860 | 640 |
| 80 Parts silica | 1,260 | 2,670 | 570 |

The silica filled stocks of Example I which were radiated in the absence of sulfur exhibited excellent tensile strength and were superior in both tensile strength and modulus over the stocks of a corresponding silica loading cured to the same degree with a sulfur system. This, as is shown in subsequent examples, is the reverse of what might be expected from stocks reinforced with carbon black or with other mineral fillers.

EXAMPLE II

Blends of silica with the butadiene/styrene rubber were prepared as in Example I and the samples were irradiated in the same manner. Some samples received a total dosage of $1\times10^7$ rep. (dose rate was $4.56\times10^6$ rep. per hour) and others received a total dosage of $1\times10^8$ rep. (dose rate was $4.38\times10^6$ rep. per hour for the first 9.28 hours and $12.9\times10^6$ rep. per hour for the last 4.55 hours). They were removed from the gamma ray field and the products were evaluated. Results were as follows:

*Table II*

| Silica, phr.[1] | Radiation Dosage, Rep. | 300 Percent Modulus, p.s.i. | Tensile, p.s.i. | Elongation, Percent |
|---|---|---|---|---|
| 60 | $1\times10^7$ | 470 | 1,750 | 1,060 |
| 60 | $1\times10^8$ | ---------- | 1,630 | 120 |
| 80 | $1\times10^7$ | 890 | 1,970 | 680 |
| 80 | $1\times10^8$ | ---------- | 2,020 | 70 |

[1] Parts by weight per 100 parts rubber.

As shown by Table II a broad range of radiation dosages can be employed in the practice of my invention. It is apparent that a radiation dosage in the range of $1\times10^7$ to $1\times10^8$ rep. provides optimum cured stocks.

EXAMPLE III

A 75/25 butadiene/2-methyl-5-vinylpyridine rubber, prepared by emulsion polymerization at 41° F. and have a Mooney value (ML-4) of 50, was blended on the mill with silica using 60 parts by weight of silica per 100 parts of rubber. The samples were irradiated as described in Example I. Some samples received a total dosage of $1\times10^7$ rep. (dose rate was $4.56\times10^6$ rep. per hour) and others received a total dosage of $3\times10^7$ rep. (dose rate was $4.50\times10^6$ rep. per hour). They were removed from the gamma ray field and the products evaluated. Results were as follows:

*Table III*

| Radiation Dosage, Rep. | 300 Percent Modulus, p.s.i. | Tensile, p.s.i. | Elongation, Percent |
|---|---|---|---|
| $1\times10^7$ | 1,030 | 2,560 | 650 |
| $3\times10^7$ | 2,060 | 2,660 | 380 |

The butadiene/methylvinylpyridine copolymer, when reinforced with silica and irradiated according to the invention, exhibit excellent tensile and modulus properties with reasonably low radiation dosages. In general, it is noted that a lower radiation dosage is required to effect an equivalent degree of cure in the pyridine copolymer than is required for the butadiene/styrene copolymer. This material thus exhibits excellent possibilities as a silica reinforced stock for vulcanization by irradiation.

EXAMPLE IV

To illustrate the unexpected quality of the invention a butadiene/styrene rubber similar to that employed in Example I was reinforced with carbon black and compounded in two separate blends. Blend A included the conventional sulfur curing system and was cured for 30 minutes at 307° F. Blend B contained only the rubber and carbon black and was cured by radiation as described in Example I, the total dosage being $3 \times 10^7$ rep. The formulations are shown below:

| Formulation | A | B |
|---|---|---|
| Butadiene/styrene copolymer | 100 | 100 |
| Carbon black [1] | 50 | 50 |
| Zinc oxide | 3 | -------- |
| Stearic acid | 1 | -------- |
| Sulfur | 1.76 | -------- |
| Santocure [2] | 1.10 | -------- |

[1] A high abrasion furnace black.
[2] As in Example I.

The properties of the cured stocks were as follows:

*Table IV*

| | A | B |
|---|---|---|
| 300 Percent Modulus, pounds per square inch | 1,960 | 1,560 |
| Tensile, pounds per square inch | 4,270 | 2,380 |
| Elongation, percent | 530 | 440 |

As shown by the above data the properties of the irradiated stock were inferior to those of the sulfur cured stock when the filler was carbon black. This is a commonly accepted trend which is unexpectedly reversed when the filler employed is silica according to my invention.

EXAMPLE V

Two elastomers, a butadiene/styrene copolymer having the same characteristics as that employed in Example I and natural rubber (No. 1 smoked sheet) were reinforced with four different solid reinforcing agents, namely silica, gamma alumina, calcium silicate, and carbon black (a high abrasion furnace black). The filler loadings were balanced to correspond to approximately equal volumes and were as follows:

| | A | B | C | D | E | F | G | H |
|---|---|---|---|---|---|---|---|---|
| | Parts by Weight | | | | | | | |
| Butadiene/Styrene Copolymer | 100 | 100 | 100 | 100 | ----- | ----- | ----- | ----- |
| Natural Rubber | ----- | ----- | ----- | ----- | 100 | 100 | 100 | 100 |
| Silica | 60 | ----- | ----- | ----- | 60 | ----- | ----- | ----- |
| Gamma Alumina | ----- | 111 | ----- | ----- | ----- | 111 | ----- | ----- |
| Calcium Silicate | ----- | ----- | 78 | ----- | ----- | ----- | 78 | ----- |
| Carbon Black | ----- | ----- | ----- | 50 | ----- | ----- | ----- | 50 |

Corresponding recipes employing sulfur curing systems were made with each of the above reinforced polymers except the calcium silicate blend which exhibited very poor results on irradiation as is shown in the evaluation data. The sulfur curing recipes were as follows:

RECIPE

| | A' | B' | D' | E' | F' | H' |
|---|---|---|---|---|---|---|
| | Parts by Weight | | | | | |
| Natural Rubber | 100 | 100 | 100 | ----- | ----- | ----- |
| Butadiene/Styrene Copolymer | ----- | ----- | ----- | 100 | 100 | 100 |
| Silica | 60 | ----- | ----- | 60 | ----- | ----- |
| Gamma Alumina | ----- | 111 | ----- | ----- | 111 | ----- |
| Carbon Black | ----- | ----- | 50 | ----- | ----- | 50 |
| Zinc oxide | 4 | 4 | 4 | 3 | 3 | 3 |
| Stearic Acid | 3 | 3 | 3 | 1 | 1 | 1 |
| Flexamine [1] | 1 | 1 | 1 | 1 | 1 | 1 |
| Sulfur | 3 | 3 | 2.5 | 3.3 | 3 | 1.75 |
| Santocure [1] | 1.25 | 1.25 | 0.5 | 1.5 | 1.25 | 1.0 |

[1] As in Example I.

The blends of rubber and filler only, without the sulfur curing system, were irradiated to a dosage of $3 \times 10^7$ rep. as described in Example I. The vulcanizates were then examined and the results are shown in Table V. The blends incorporating the sulfur curing system were cured for 30 minutes at 307° F. and evaluated similarly with the results shown in Table VI.

*Table V*

| Blend | Rubber | Filler | 300 Percent Modulus, p.s.i. | Tensile, p.s.i. | Elongation, Percent |
|---|---|---|---|---|---|
| A | Butadiene/Styrene. | Silica | 1,260 | 3,750 | 730 |
| B | do | Gamma Alumina. | 900 | 2,880 | 700 |
| C | do | Calcium Silicate. | 230 | 310 | 530 |
| D | do | Carbon Black | 1,210 | 2,380 | 520 |
| E | Natural | Silica | 1,080 | 4,050 | 810 |
| F | do | Gamma Alumina. | 1,550 | 2,460 | 440 |
| G | do | Calcium Silicate. | 590 | 1,320 | 540 |
| H | do | Carbon Black | 1,500 | 2,110 | 390 |

*Table VI*

| | 300 Percent Modulus, p.s.i. | Tensile, p.s.i. | Elongation, Percent |
|---|---|---|---|
| Natural Rubber: | | | |
| A' Silica | 690 | 3,000 | 810 |
| B' Gamma Alumina | 380 | 3,140 | 1,180 |
| D' Carbon Black | 1,450 | 3,660 | 600 |
| Butadiene/Styrene Copolymer: | | | |
| E' Silica | 500 | 3,020 | 1,290 |
| F' Gamma Alumina | 420 | 3,750 | 1,080 |
| H' Carbon Black | 1,580 | 3,250 | 530 |

The silica employed had a surface area having 150 square meters per gram, a particle diameter of 22 millimicrons, and a pH of 7–7.5.

As shown by comparing the data of Tables V and VI, silica reinforced rubbers which are vulcanized by gamma radiation are superior in tensile strength to the same type of stock when cured with a conventional sulfur system. Carbon black and gamma alumina as reinforcing fillers, on the other hand, exhibited the reverse trend. Calcium silicate reinforced stocks were greatly inferior to the other blends when vulcanized by gamma irradiation. A surprising superiority of silica reinforced elastomers vulcanized by ionizing irradiation is quite well illustrated by the above data. Thus with the combination of process steps of my invention a superior colorable rubber stock is provided. As will be evident to those skilled in the art, various modifications of this invention can be made, or followed, in the light of the foregoing disclosure and discussion, without departing from the spirit or scope thereof.

I claim:

1. An improved cured rubber stock consisting essentially of an irradiated blend of 100 parts by weight of gum rubber selected from the group consisting of natural rubber, synthetic elastomers formed as homopolymers of conjugated dienes having from 4 to 8 carbon atoms per molecule, and copolymers having a major amount of conjugated diene and a minor amount of copolymerizable monomer containing the $CH_2=C<$ group and from 20 to 150 parts by weight of colloidal silica, said blend having been irradiated by exposure to high energy ionizing radiation having energy at least equivalent to X-rays at a dose rate of from about $10^3$ to $3\times10^7$ rep. per hour and for a total dosage of from about $10^6$ to $5\times10^8$ rep.

2. A cured rubber stock of claim 1 wherein said gum rubber is natural rubber.

3. A cured rubber stock of claim 1 wherein said gum rubber is butadiene/styrene copolymer.

4. A cured rubber stock of claim 1 wherein said gum rubber is butadiene/2-methyl-5-vinylpyridine copolymer.

5. A rubber stock according to claim 1 wherein said blend has been subjected to gamma rays.

6. An improved cured rubber stock comprising an irradiated blend of substantially sulfur-free elastomeric polymer selected from the group consisting of natural rubber, synthetic homopolymers of conjugated dienes having from 4 to 8 carbon atoms per molecule and copolymers having a major amount of conjugated diene and a minor amount of copolymerizable monomer containing the $CH_2=C<$ group and a reinforcing amount of silica, said blend having been subjected to a cross-linking dosage of ionizing radiation having energy at least equivalent to X rays.

7. A method of preparing an improved cured rubber stock which comprises blending a raw, uncured gum selected from the group consisting of natural rubber, synthetic elastomers formed as homopolymers of conjugated dienes having from 4 to 8 carbon atoms per molecule, and copolymers having a major amount of conjugated diene and a minor amount of copolymerizable monomer containing the $CH_2=C<$ group with a reinforcing amount of colloidal silica, and curing the resultant blend in the absence of sulfur curatives by exposure to a vulcanizing amount of ionizing radiation having energy at least equivalent to X rays.

8. A method of preparing an improved cured rubber stock which comprises blending 100 parts by weight of gum rubber selected from the group consisting of natural rubber, synthetic elastomers formed as homopolymers of conjugated dienes having from 4 to 8 carbon atoms per molecule, and copolymers having a major amount of conjugated diene and a minor amount of copolymerizable monomer containing the $CH_2=C<$ group with from 20 to 150 parts by weight of colloidal silica and curing the resultant blend in the absence of sulfur curatives by exposure to high energy ionizing radiation having energy at least equivalent to X rays at a dose rate of about $10^3$ to $3\times10^7$ rep. per hour and for a total dosage of about $10^6$ to $5\times10^8$ rep.

9. A method according to claim 8 wherein said gum rubber is natural rubber.

10. A method according to claim 8 wherein said gum rubber is butadiene/styrene copolymer.

11. A method according to claim 8 wherein said gum rubber is butadiene/2-methyl-5-vinylpyridine copolymer.

12. A method according to claim 8 wherein said radiation is gamma rays.

References Cited in the file of this patent

UNITED STATES PATENTS

| | | |
|---|---|---|
| 2,763,609 | Lewis et al. | Sept. 18, 1956 |
| 2,805,072 | Smith | Sept. 3, 1957 |

FOREIGN PATENTS

| | | |
|---|---|---|
| 665,262 | Great Britain | Jan. 23, 1952 |

OTHER REFERENCES

Kuzminskii et al.: "Atomic Energy" (U.S.S.R.), No. 3, pp. 137–140 (1956), Item No. 64 H 11R, from Associated Technical Services Reprint Dept., P.O. Box 271, East Orange, N.J.

Bopp et al.: ORNL–1373, page 21, July 23, 1953.

Kuzminskii et al.: "Atomnaya Energiya," vol. 1, No. 3, pages 137–142 (1956).

"Science News Letter," vol. 67, page 101, February 12, 1955.

UNITED STATES PATENT OFFICE

CERTIFICATION OF CORRECTION

Patent No. 2,964,457 December 13, 1960

Gerard Kraus

It is hereby certified that error appears in the above numbered patent requiring correction and that the said Letters Patent should read as corrected below.

Column 7, line 9, for "$CH_2$—C<" read -- $CH_2$=C< --.

Signed and sealed this 18th day of July 1961.

(SEAL)
Attest:

ERNEST W. SWIDER
Attesting Officer

DAVID L. LADD
Commissioner of Patents